2,877,092

COORDINATION COMPOUND-SOLVENT EXTRACTION PROCESS FOR URANIUM RECOVERY

William H. Reas, Berkeley, Calif., assignor to the United States of America as represented by the United States Atomic Energy Commission No Drawing. Application March 26, 1947
Serial No. 737,434

15 Claims. (Cl. 23—14.5)

This invention relates to the separation of uranium from an aqueous solution and more particularly relates to a solvent extraction process for separating uranium from an aqueous solution containing a uranyl salt and a thorium salt.

With the development of neutronic reactors for the production of plutonium by neutron bombardment of $U^{238}$, it has been found that the neutrons which would normally escape from the reactor can be utilized by placing a blanket of thorium or thorium oxide around the reactor. These neutrons are absorbed by thorium, which is chiefly $Th^{232}$, to produce $Th^{233}$. The latter decays with a half-life of 23.5 minutes to $Pa^{233}$ which in turn decays with a half-life of 27.4 days to $U^{233}$. Some of the neutrons escaping from the uranium neutronic reactor are fast neutrons and these with slow neutrons cause fission of $Th^{232}$ and some of the $U^{233}$ produced, producing radioactive fission fragments. By the use of this thorium blanket desirable $Pa^{233}$ and $U^{233}$ are produced. By a suitable period of aging most of the $Pa^{233}$ will be converted to $U^{233}$. However, the maximum amount of $U^{233}$ that may be obtained will be about 1% based on the $Th^{232}$ content and in the usual case the $U^{233}$ content will be less than 0.1%. Thus, a problem arose of developing a process for separating uranium from its mixture with thorium in which the thorium-to-uranium ratio was quite high.

An object of this invention is to separate uranium from most of the thorium.

Another object of the present invention is to separate uranium from an aqueous solution containing a uranyl salt and a thorium salt.

Other objects and advantages of this invention will be apparent from the description which follows.

I have found that uranium can be separated from its mixture with thorium by adding to an aqueous solution of their salts an organic complexing agent and extracting the resultant coordination compound by means of a liquid organic compound that is a good solvent for the organic complexing agent.

Organic complexing agents have been widely developed as analytical reagents for detecting various metal ions in aqueous solutions. These organic complexing agents form coordination compounds with metal ions imparting a new color to the aqueous system or forming colored precipitates. Most of the heavy metals are capable of forming coordination compounds with the organic complexing agents. I have found that, if an organic complexing agent is added to an aqueous solution containing a uranyl salt and a thorium salt and then the aqueous solution is contacted with an organic solvent in which the organic complexing agent is soluble, the coordination compound formed by the uranyl salt and the organic complexing agent will be extracted by the organic solvent. When the amount of organic complexing agent that is added is limited to a quantity that is less than 5 mols of the complexing agent for each mol of uranyl salt and thorium salt, the coordination compound of the uranyl salt is formed and extracted in preference of the coordination compound of the thorium salt. Thus, a purification of uranium with respect to thorium content is effected. Also in the case of a mixture of thorium and uranium where the mixture contains a very high percentage of thorium, it is possible to extract a mixture of coordination compounds in which the ratio of uranium-to-thorium will be considerably larger than one. In the preferred embodiment the number of mols of complexing agent is less than 6 mols per mol only of uranyl salt.

The amount of organic complexing agent that will be used will be dependent upon the concentration of uranyl salt in the aqueous solution. The ratio of mols of organic complexing agent to mols of uranyl salt will be preferably between 2 to 6. If more than 6 mols of complexing agent are used per mol of uranyl salt, more of the coordination compound of the thorium salt will be extracted. It is believed that the separation obtained by the process of this invention is due to the stronger coordinating tendency of $UO_2^{+2}$ ion as compared to that of $Th^{+4}$ ion. Thus, when a limited amount of organic complexing agent is used, most of the coordination compound formed is the coordination compound of the uranyl salt and when this is extracted a suitable separation between uranium and thorium is obtained.

Examples of suitable organic complexing agents are: acetylacetone, alloxantin, catechol, guanidine thiocyanate, thiosalicylic acid, pyrogallol, anthranilic acid, and compounds having the formula:

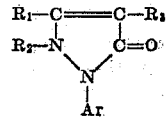

where $R_1$ and $R_2$ are alkyl radicals preferably containing one to twelve carbon atoms, $R_3$ is a member of the group consisting of hydrogen and halogen atoms, alkyl radicals preferably containing one to twelve carbon atoms, substituted amino groups, and the nitroso group, and Ar is an aryl radical that may be a benzene ring or a condensed ring, such as naphthalene. Alkyl radicals may be attached to the aromatic ring, and the total number of such alkyl carbon atoms is preferably less than eight. Examples of suitable radicals for $R_1$, $R_2$ and $R_3$ are methyl, isobutyl and lauryl groups. Antipyrine, bromoantipyrine and pyramidon (1-phenyl-2, 3-dimethyl-4-dimethylamino-5-pyrazolone) are examples of compounds having that formula.

The organic solvents that may be used for the extraction of the coordination compound formed by reaction of the uranyl salt and the organic complexing agent are limited to those organic compounds, which are liquid at the temperature of carrying out the process, which are substantially immiscible with water, and which are solvents for the organic complexing agents. Examples of suitable organic solvents are the highly chlorinated hydrocarbons that contain at least 2 chlorine atoms per carbon atom, nitroaromatic hydrocarbons, ketones, esters, and glycol ethers. Specific examples of these types of suitable organic solvents are as follows: chloroform, carbon tetrachloride, nitrobenzene, methyl isobutyl ketone (commonly called hexone), methyl n-amyl ketone, ethyl acetate, amyl acetate, dibutyl ether of diethylene glycol and dibutyl ether of tetraethylene glycol.

Some of these solvents are extractants for uranyl nitrate without the use of an organic complexing agent to form a coordination compound, while others, e. g., chloroform and nitrobenzene, extract essentially no uranyl nitrate from an aqueous solution even if the latter contains salting-out agents. The ratio of organic solvent to aqueous solution that may be used in the process of this invention may be varied widely, e. g., from about 1 to 10 to about 10 to 1.

Since the complexing agents are soluble in the organic solvents, such solutions may be used instead of adding the complexing agent to the aqueous solution. The process may be carried out by dissolving the complexing agent in the organic solvent, then contacting the aqueous solution with this organic solvent solution.

The water-soluble uranyl and thorium salts that may be used include the nitrates, perchlorates, acetates, and trichloroacetates. The aqueous solutions may contain widely varying concentrations of uranyl salt and thorium salt. For example, the total concentration of these salts may be between 0.001 and 2 M. The aqueous solution should have a pH of less than 5 to stabilize the uranyl salt. The pH range is preferably between 0 and 3. In addition, the aqueous solution may contain salting-out agents.

As an illustration of this invention an aqueous solution containing 5 millimols $Th(NO_3)_4$, 1 millimol $UO_2(NO_3)_2$, and 48.6 millimols HCl was contacted with 10 ml. $CHCl_3$ containing antipyrine. The results of three experiments are presented in Table I. In the third experiment the aqueous solution also contained 2 millimols $NaClO_4$.

Table I

|  | Expt. 1 | Expt. 2 | Expt. 3 |
|---|---|---|---|
| Millimols antipyrine | 38 | 36 | 38 |
| Volume aqueous layer, ml | 21.3 | 20.6 | 21.5 |
| Percent $Th^{+4}$ extracted | 5 | 5 | 6 |
| Percent $UO_2^{++}$ extracted | 91 | 94 | 89 |

These results indicate that uranyl salt preferentially formed a coordination compound and was extracted even though sufficient complexing agent was present to theoretically form coordination compounds with both the uranyl salt and the thorium salt.

When 8.4 ml. of an aqueous solution containing 5 millimols $Th(NO_3)_4$, 1 millimol $UO_2(NO_3)_2$, 10 millimols $NaNO_3$ and 5 millimols $HNO_3$ was contacted with 10 ml. nitrobenzene containing varying amounts of antipyrine, the uranyl nitrate as a coordination compound was preferentially extracted. The results of these experiments are reported below in Table II, along with an experiment where no antipyrine was present.

Table II

| Millimols Antipyrine | Percent $Th^{+4}$ Extracted | Percent $UO_2^{++}$ Extracted | Separation Coefficient |
|---|---|---|---|
| 0 | 0.5 | 1 | 2 |
| 0.5 | 0.5 | 31 | 90 |
| 1 | 1.5 | 47 | 59 |
| 2 | 4.0 | 56 | 31 |
| 3 | 8.5 | 62 | 18 |
| 4 | 14 | 69 | 14 |
| 5 | 21 | 75 | 12 |
| 6 | 28 | 80 | 10 |

The separation coefficient in Table II is defined as the ratio of the extraction coefficient of $UO_2^{++}$ and the extraction coefficient of $Th^{+4}$. In this case the extraction coefficient of uranium or thorium is defined as the number of mols of uranium or thorium in the nitrobenzene divided by the number of mols of uranium or thorium in the aqueous phase.

The data in Tables I and II indicate that using chloroform as the organic solvent there would be even less thorium extraction as a coordination compound than occurred in the experiments reported in Table I, if less than 5 mols of antipyrine for each mol of uranyl salt and thorium salt would be used, without a substantial decrease in uranyl salt extraction as a coordination compound.

In further reference to Table II, it is noted that in the experiment using 6 millimols antipyrine the extracted coordination compounds of uranyl and thorium salts contained an average of 2.7 mols of antipyrine per mol of metal ions. Thus, it is not necessary to form coordination compounds in which all of the possible coordination bonds of the metal ions have been utilized in order to produce coordination compounds that are extractible by solvents.

Like uranyl nitrate, uranyl perchlorate may be used to form a coordination compound which is extractible. However, as indicated by Table III the perchlorate ion increases the degree of extraction of thorium as a coordination compound. These data were obtained using 20.5 ml. of an aqueous solution containing 5 millimols $Th(NO_3)_4$, 42.3 millimols HCl and varying amounts of $NaClO_4$. In each experiment the particular aqueous solution was contacted with 10 ml. of $CHCl_3$ containing 38 millimols antipyrine.

Table III

| Millimols $NaClO_4$ Added | Percent $Th^{+4}$ Extracted |
|---|---|
| 0 | 13 |
| 5 | 29 |
| 10 | 36 |
| 15 | 39 |
| 20 | 41 |

However, the extraction of a coordination compound of a thorium salt from an aqueous solution containing a substantial amount of perchlorate ion can be suppressed by the presence in the aqueous solution of a high concentration of an inorganic acid, other than perchloric acid. Such an acid is hydrochloric acid, as indicated by the data in Table IV. These data were obtained by contacting 21 ml. of an aqueous solution containing 5 millimols $Th(NO_3)_4$, 10 millimols $NaClO_4$ and varying amounts of HCl with 10 ml. $CHCl_3$ containing 38 millimols antipyrine.

Table IV

| Millimols HCl Added | Percent $Th^{+4}$ Extracted |
|---|---|
| 38 | 42 |
| 42.3 | 39 |
| 48.6 | 24 |
| 58.2 | 9.5 |

The use of the term "extraction" in this specification includes not only the case where the coordination compound is soluble in the organic solvent, but also the case where only part is soluble and the rest is dispersed in colloidal form in the organic solvent due to the "wetting" action of the solvent.

The illustrations have been batch experiments. However, the process is not limited to batch operation. Thus, the extraction may be effected by the use of batch, continuous batch, batch countercurrent, or continuous countercurrent methods. In the case of continuous operation either the aqueous solution or the organic solvent may be the dispersed phase, and in any particular case, of course, the other liquid would be the continuous phase. By carrying out the process several times, each time destroying the coordination compound in order to extract the uranyl salt from the organic solvent, a high degree of purification may be obtained.

The foregoing illustrations and embodiments of this invention are not intended to limit its scope which is to be limited entirely by the appended claims.

What is claimed is:

1. A process for the separation of uranium from thorium which comprises adding an organic compound having the formula

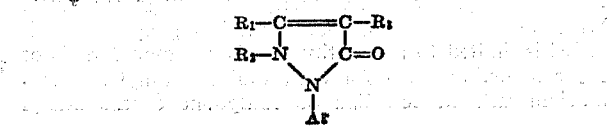

where $R_1$ and $R_2$ are alkyl radicals, $R_3$ is a member of the group consisting of hydrogen and halogen atoms, alkyl radicals, substituted amino groups, and the nitroso group and Ar is an aryl radical, to an aqueous solution containing a uranyl salt and a thorium salt, contacting said aqueous solution with a substantially water-immiscible organic solvent in which said organic compound is soluble, and separating the resultant aqueous phase and the organic extract phase containing at least part of said uranyl salt as a coordination compound.

2. The process of claim 1 in which the organic compound is antipyrine.

3. The process of claim 1 in which the organic compound is pyramidon.

4. The process of claim 1 in which the organic solvent is chloroform.

5. The process of claim 1 in which the organic solvent is nitrobenzene.

6. The process of claim 1 in which the organic solvent is an ester.

7. The process of claim 1 in which the organic solvent is amyl acetate.

8. A process for the separation of uranium from thorium which comprises adding an organic compound having the formula

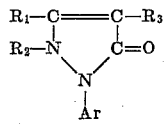

where $R_1$ and $R_2$ are alkyl radicals, $R_3$ is a member of the group consisting of hydrogen and halogen atoms, alkyl radicals, substituted amino groups, and the nitroso group and Ar is an aryl radical, to an aqueous solution containing a uranyl salt and a thorium salt, said organic complexing agent being added in an amount less than 5 mols for each mol of uranyl salt and thorium salt, contacting said aqueous solution with a substantially water-immiscible organic solvent in which said organic compound is soluble, and separating the resultant aqueous phase and the organic extract phase containing at least part of said uranyl salt as a coordination compound.

9. A process for the separation of uranium from thorium which comprises adding an organic compound having the formula

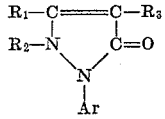

where $R_1$ and $R_2$ are alkyl radicals, $R_3$ is a member of the group consisting of hydrogen and halogen atoms, alkyl radicals, substituted amino groups, and the nitroso group and Ar is an aryl radical, to an aqueous solution containing a uranyl salt and a thorium salt, said organic complexing agent being added in an amount less than 6 mols of organic complexing agent per mol of uranyl salt, contacting said aqueous solution with a substantially water-immiscible organic solvent in which said organic compound is soluble, and separating the resultant aqueous phase and the organic extract phase containing at least part of said uranyl salt as a coordination compound.

10. A process for the separation of uranium from thorium which comprises adding an organic compound having the formula

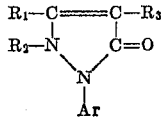

where $R_1$ and $R_2$ are alkyl radicals, $R_3$ is a member of the group consisting of hydrogen and halogen atoms, alkyl radicals, substituted amino groups, and the nitroso group and Ar is an aryl radical, to an aqueous solution containing uranyl nitrate and thorium nitrate, contacting said aqueous solution with a substantially water-immiscible organic solvent in which said organic compound is soluble and separating the resultant aqueous phase and the organic extract phase containing at least part of said uranyl nitrate as a coordination compound.

11. A process for the separation of uranium from thorium which comprises adding an organic compound having the formula

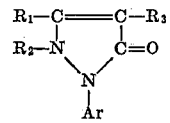

where $R_1$ and $R_2$ are alkyl radicals, $R_3$ is a member of the group consisting of hydrogen and halogen atoms, alkyl radicals, substituted amino groups, and the nitroso group and Ar is an aryl radical, to an aqueous solution containing uranyl perchlorate and thorium perchlorate, contacting said aqueous solution with a substantially water-immiscible organic solvent in which said organic compound is soluble and separating the resultant aqueous phase and the organic extract phase containing at least part of said uranyl perchlorate as a coordination compound.

12. A process for the separation of uranium from thorium which comprises adding an organic compound having the formula

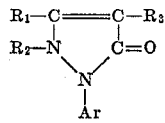

where $R_1$ and $R_2$ are alkyl radicals, $R_3$ is a member of the group consisting of hydrogen and halogen atoms, alkyl radicals, substituted amino groups, and the nitroso group and Ar is an aryl radical, to an aqueous solution containing uranyl acetate and thorium acetate, contacting said aqueous solution with a substantially water-immiscible organic solvent in which said organic compound is soluble and separating the resultant aqueous phase and the organic extract phase containing at least part of said uranyl acetate as a coordination compound.

13. A process for the separation of uranium from thorium which comprises contacting an aqueous solution containing a uranyl salt and a thorium salt with a substantially water-immiscible organic solvent solution of an organic compound having the formula

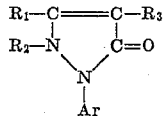

where $R_1$ and $R_2$ are alkyl radicals, $R_3$ is a member of the group consisting of hydrogen and halogen atoms, alkyl radicals, substituted amino groups, and the nitroso group and Ar is an aryl radical, and separating the resultant aqueous phase and organic extract phase containing at least part of said uranyl salt as a coordination compound.

14. A process for the separation of uranium from thorium which comprises contacting an aqueous solution containing a uranyl salt and a thorium salt with a substantially water-immiscible organic solvent solution containing an organic compound having the formula

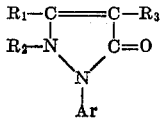

where $R_1$ and $R_2$ are alkyl radicals, $R_3$ is a member of the group consisting of hydrogen and halogen atoms, alkyl radicals, substituted amino groups, and the nitroso group and Ar is an aryl radical, in an amount less than 5 mols for each mol of uranyl salt and thorium salt, and separating the resultant aqueous phase and organic extract phase containing at least part of said uranyl salt as a coordination compound.

15. A process for the separation of uranium from thorium which comprises contacting an aqueous solution containing a uranyl salt and a thorium salt with a substantially water-immiscible organic solvent solution containing an organic compound having the formula

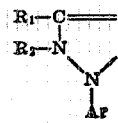

where $R_1$ and $R_2$ are alkyl radicals, $R_3$ is a member of the group consisting of hydrogen and halogen atoms, alkyl radicals, substituted amino groups, and the nitroso group and Ar is an aryl radical, in an amount less than 6 mols of organic compound per mol of uranyl salt, and separating the resultant aqueous phase and organic extract phase containing at least part of said uranyl salt as a coordination compound.

References Cited in the file of this patent

Mellor: "Inorganic and Theoretical Chemistry," vol. 4, pp. 119–120. Publ. in 1923 by Longmans, Green & Co., London.

Misciatelli: "Chemical Abstracts," vol. 25, pp. 1452–3, 1931.